United States Patent

[11] 3,632,043

[72] Inventors John D. Kirschmann
 Bismarck, N. Dak. 58501;
 Harold Blumhardt, Fredonia, N. Dak. 58440
[21] Appl. No. 17,490
[22] Filed Mar. 9, 1970
[45] Patented Jan. 4, 1972

[54] MULTINOZZLE SPRAYING ATTACHMENTS FOR GRAIN DRILLS AND OTHER SEEDING IMPLEMENTS
4 Claims, 8 Drawing Figs.

[52] U.S. Cl. ............................................. 239/146,
 137/525, 239/172, 239/175, 239/157, 239/570,
 239/571, 239/575
[51] Int. Cl. ................................................ B05b 9/06
[50] Field of Search ...................................... 239/146,
 172, 175, 157, 570, 571, 575, 576; 137/525

[56] References Cited
UNITED STATES PATENTS

| | | | |
|---|---|---|---|
| 2,774,626 | 12/1956 | Gerbracht | 239/157 |
| 3,231,149 | 1/1966 | Yuza | 137/525 X |
| 3,281,078 | 10/1966 | Cape | 239/570 X |
| 3,477,416 | 11/1969 | Line | 137/525 X |

*Primary Examiner*—M. Henson Wood, Jr.
*Assistant Examiner*—Reinhold W. Thieme
*Attorney*—Williamson, Palmatier & Bains ABSTRACT: The system and novel components of the invention are embodied in the plurality of nozzle heads which are connected for supply of spray liquid (including fertilizers, herbicides and insecticides) wherein two closely cooperating main and novel combinations and features are present. First, each of the nozzle heads is provided with an adequate filter medium through which supplied liquid from the tanks and manifolds of the attachment passes. Thereafter the filtered liquid is caused to pass downwardly towards the nozzle discharge tube and through a communicating port or valve passage of rigid structure and having a rounded exterior of substantial area through which the valving port or ports extend. A pressure-responsive check valve constructed from flexible, stretchable and elastic material such as natural or live rubber, latex or synthetic rubber is employed and in contoured relation, lies over and covers not only the said valving port or ports, but a relatively large rounded area surrounding the ports. The elastic valve element is at least lightly tensioned to contact against said surfaces and will be stretched or deformed when pressure through the valving ports exceeds a predetermined level, then admitting passage of the spray liquid around the edge or edges thereof to a communication passage which extends into the upper end of the depending nozzle discharge tube. The second feature is a novel, large area zoned filtering screen, closely cooperating with the previous feature.

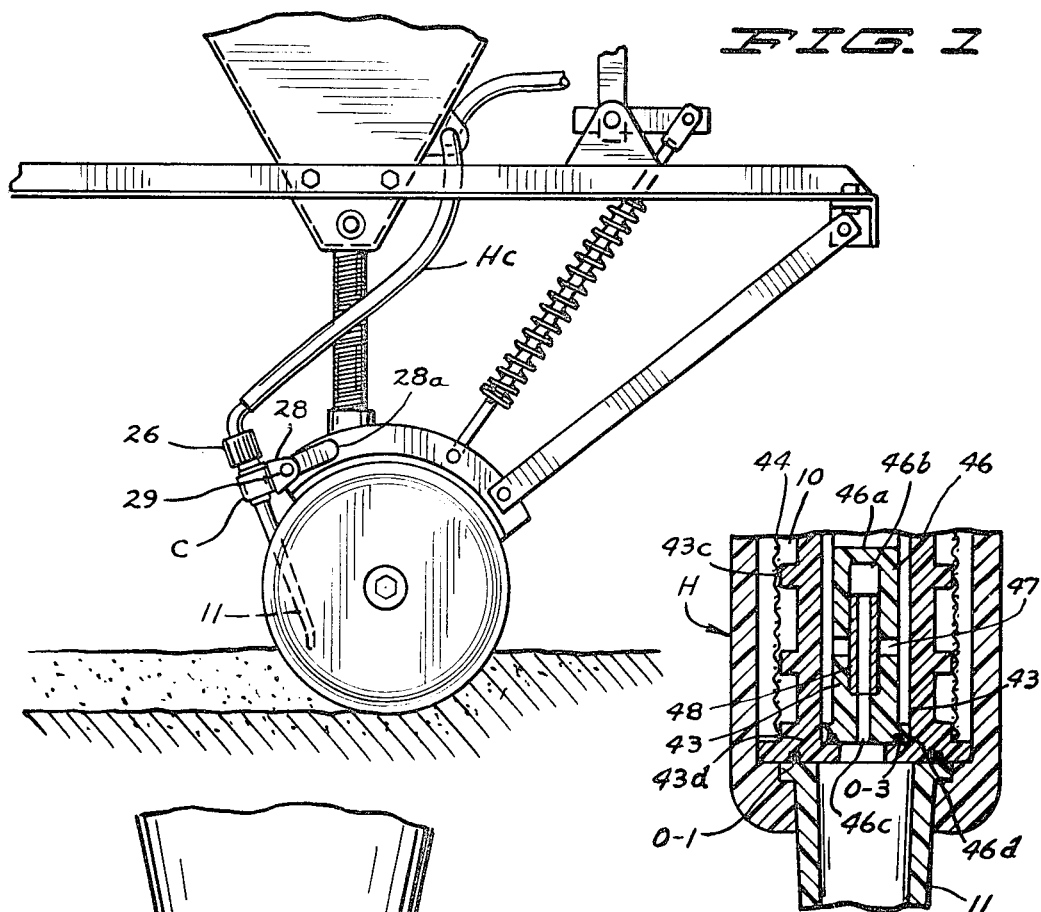
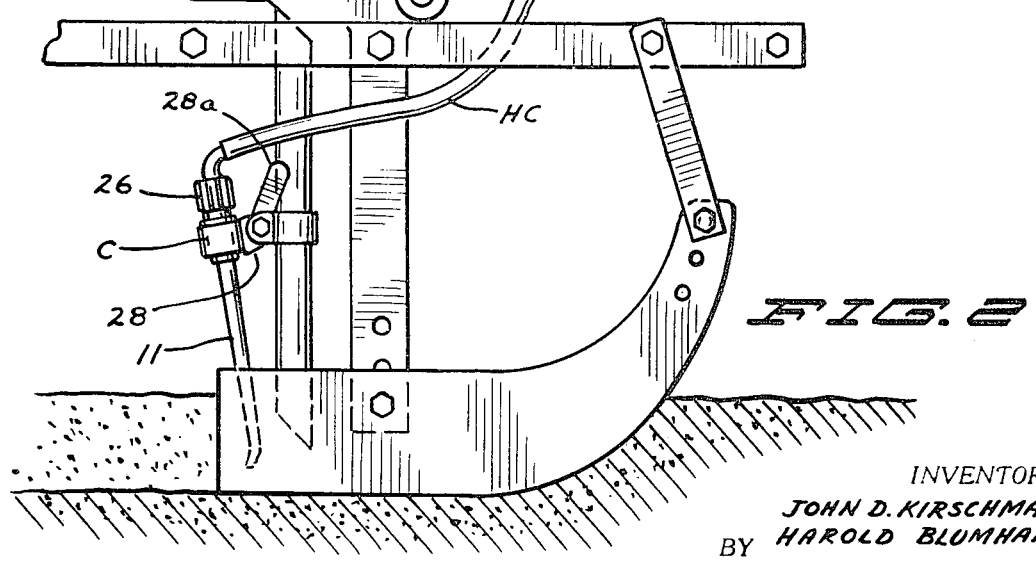

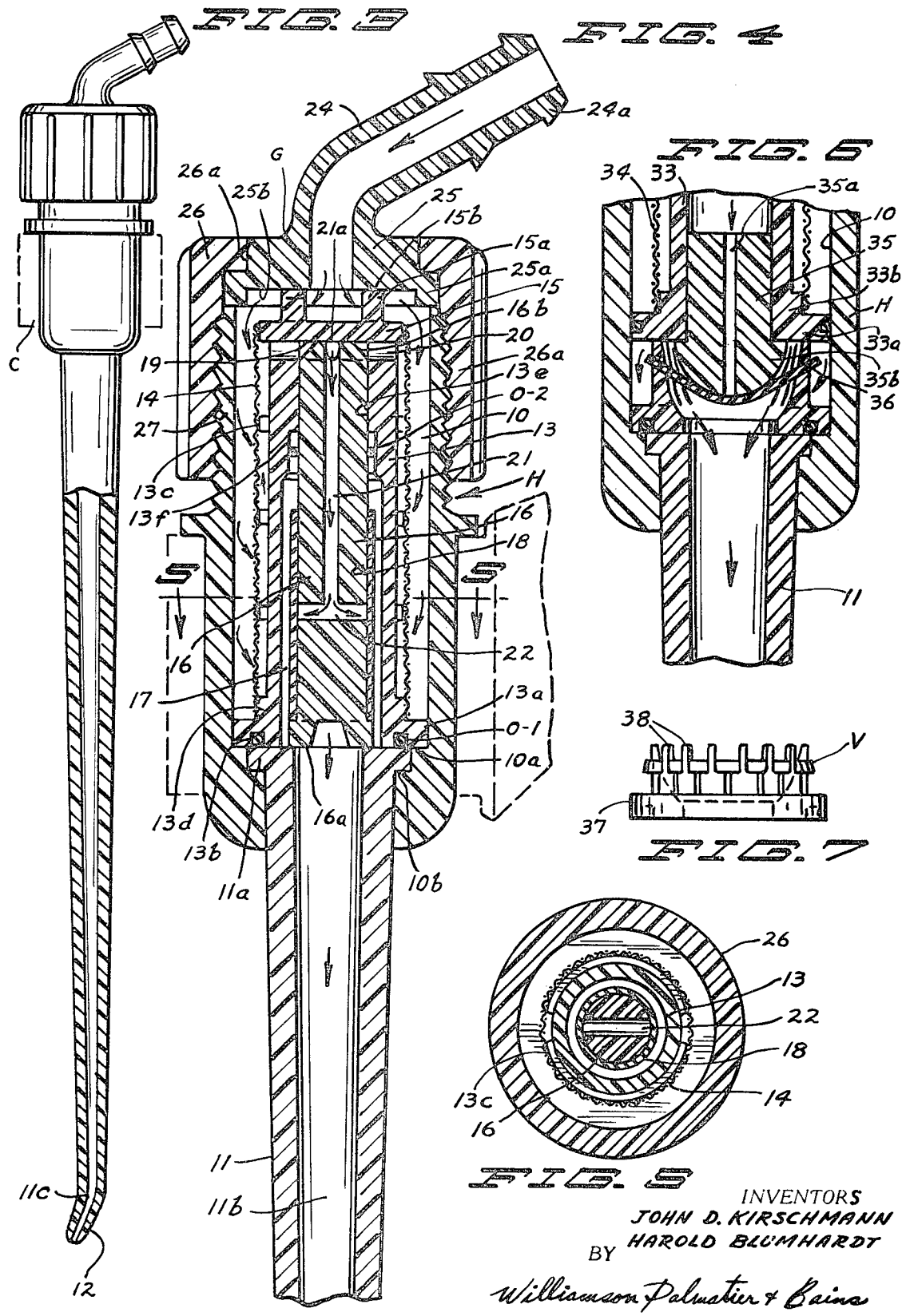

MULTINOZZLE SPRAYING ATTACHMENTS FOR GRAIN DRILLS AND OTHER SEEDING IMPLEMENTS

This invention relates to multinozzle spraying attachments for grain drills and other seeding implements, and relates particularly to improvements for preventing flow or dripping from the said nozzles when the seeding implement is not in travel and also when the implement is in travel but with the main valve closed for making turns, etc.

PRIOR ART AND ITS PROBLEMS

At the present time spray attachments are quite extensively used in vehicular drills and the like, for distributing liquid ingredients at the multiple seeding lines of the implement in travel. These spray or liquid ingredients include various fertilizers, insecticides and herbicides. In most instances such attachments comprise one or more supply tanks, a pump, liquid manifolds and a plurality of liquid applicator nozzles, one for each drill or seeding unit. The said spray attachments and the parts thereof are conveniently attached to the chassis and other parts of the drills or planters, with the individual nozzles of the spray attachment being usually attached respectively to the depending seed conduits. The pump or pumps for circulating the liquid from the tank, through manifolds, to the plurality of nozzles, are connected for driving with a wheel of the drill implement so that the discharged volume of liquid through the several nozzles is at least approximately proportioned to the travel speed of the vehicle over the ground.

While some of the liquid fertilizers, herbicides and insecticides employed are in quite uniform solution, many of the liquid mixtures contain fine particles and some thick emulsified particles and globules, which with the filtering media and individual nozzle check valves now employed, constantly cause dripping of the liquid at the terminal ends of the nozzles when the drill implement is not in travel, as well as when the implement is in travel in making turns with the main valves from the tanks closed by the operator.

At present all multiple spray nozzle attachments known to applicant have two principal unsolved problems and objections.

First, the distribution of the spray liquid from the tank or tanks to the multiplicity of nozzle entrances or heads, and the filtering and screening of liquid in the heads of said nozzles to the ultimate terminals are inadequate and not sufficiently versatile to properly distribute liquids varying in viscosity and small amounts of granular or globular materials contained.

Secondly, the individual check valves for the nozzles intended to prevent dripping of liquid when the machine is not in travel, particularly in combination with the first problem enumerated, is responsible for waste of spray liquid averaging, according to my tests, observation and calculations, from 15 to 25 percent of the original liquid introduced into the tanks.

OBJECTS OF THE INVENTION

It is an object of the present invention to provide economical and highly efficient multiple spray attachments for drills, corn planters and the like, which will positively overcome the aforementioned objections in present day spray attachments and which will quite accurately supply proper flow of liquid through each nozzle during all operating travel speeds of the vehicle, and will further prevent flow or dripping of the spray liquid when the vehicle is standing still and also when the main valves from the tanks are closed and the vehicle is traveling, making turns and the like.

More specifically it is an object of our invention to provide, with a free-flowing centralized filter medium in each nozzle head, a positive pressure-responsive check valve system for each nozzle which closes valve passages over a relatively great area of the element or part through which the passage is made, thus positively preventing dripping of the nozzle during all circumstances when such is undesirable, in contrast to the prior art now known.

Another and more specific object is the provision for each nozzle of a pressure-responsive check valve mechanism employing a stretchable and highly elastic valve element which surrounds not only the discharge passage to the depending end of each nozzle, but surrounds and encircles a very substantial area of a rounded component through which the valve passage extends.

The foregoing and other objects will be more apparent from the following description made in the accompanying drawings wherein similar reference characters refer to similar parts throughout the several views and in which:

FIG. 1 is a side elevation showing the embodiment of one of our nozzles in the system, operatively attached and supported from a vehicular grain drill, for spraying and discharging liquid in the seed line of one of the drills;

FIG. 2 is a similar view showing application attachment of our form of the invention, to a conventional corn planter;

FIG. 3 is a view mostly in side elevation of one form of the improved nozzle, with the lower portion of the nozzle broken and shown in vertical section;

FIG. 4 is a vertical section taken on a larger and approximately full scale of said form of this invention, with arrows indicating the flow of the spray liquid;

FIG. 5 is a horizontal section taken approximately on the line 5—5 of FIG. 4;

FIG. 6 is a vertical section showing the lower portion of the head of a second form of the invention, and with the lower portion of the nozzle discharge tube broken away;

FIG. 7 is a side elevation of the abutment cage for limiting opening movement of the elastic valve member, and it is detached from the general nozzle structure; and FIG. 8 is a view similar to FIG. 6, showing still another form of the nozzle and check valve.

It will be understood that since this invention involves primarily the components and structure involved in the head, filtering means and check valve of each nozzle, the supply tank or tanks, manifolds connected therewith, and the pump or pumps of the general system, need not be shown as they are more or less conventional with the prior art. We should state that the pump employed should be a positive piston type of pump or a rotary pump, or of gear or other structure, drivably connected with one of the wheels or other rotating part, to vary the r.p.m. of the pump in proper synchronism with the travel speed of the vehicle or drill over the ground, in operation.

It will also be understood that the system includes a positive shiftable valve structure for each manifold, or each tank, to positively cut off discharge flow of liquid from the tank when the operator so desires.

Referring now to the structure, components and operation of the first form of the invention illustrated in FIGS. 1 to 5 inclusive of the drawings, a generally cylindrical nozzle head constructed of metal, preferably of noncorrosive type, is employed, indicated as an entirety by the letter H. Head H is open at its upper end and has an elongate, cylindrical chamber 10 formed therein, and provided with an annular abutment shoulder 10a at its lower end, and a second smaller diameter shoulder 10b formed below shoulder 10a, for abutment with the upper flanged end 11a of an elongate depending nozzle discharge tube 11. The interior or bore 11b of the discharge tube tapers gradually from its upper end to a point 11c near the discharge extremity thereof. From this point the discharge tube is generally inclined rearwardly to form a terminal portion 12 and the interior of this portion 12 is diminished relative to the lower end of the part thereabove, to provide a discharge orifice which causes a small caking seal to be formed in the normal operation of the attachment.

A generally cylindrical, screen-holding thimble 13 is removably disposed within the cylindrical chamber 10 of the nozzle head, having its exterior periphery concentrically spaced some distance from the cylindrical internal wall of said chamber. Thimble 13 has an enlarged circular disc base 13a which nicely fits the lower portion of chamber 10 and abuts against the shoulder 10a. Base 13a in channel 13b carries an O-ring O-1 which protrudes from the flat lower surface of the base and lies in thrust engagement with the flat upper surface of the upper circular flange 11a of the nozzle discharge tube 11. The exterior periphery of thimble 13 carries or has integrally formed therewith a longitudinally spaced series of broken screen-engaging beads 13c, said beads constituting segments spaced close together to permit the passage of liquid between the same, and which engage and distend a cylindrical screen 14, the lower end of said screen being telescoped about a flange 13d provided by said thimble just above its base 13a. The top of screen 14 surrounds and may be attached to the top pressure plug of disc form, 15, which has an upstanding concentric sleeve 15a integrally formed therein and provided with two or more radial liquid ports 15b therethrough, for communicating the spray liquid to the exterior of the screen, communicating with the annular passage formed between the peripheral wall of chamber 10 and the exterior of the cylindrical screen 14. Internally and removably fitted within the interior of thimble 13, an elongate passage-forming rod is mounted with the upper portion smoothly fitting the upper thickened, internal and diminished portion 13e of the thimble, and an O-ring O-2 is interposed between the circular channel 13e of the thimble and the exterior periphery of the passage rod 16, thus sealing the joint between rod 16 and the interior of the thimble near the upper portion of the head of the nozzle. Below O-ring O-2 and circular channel 13f, the internal diameter of the thimble 13 is enlarged, forming a cylindrical chamber 17 for providing with the exterior of rod 16 and the thimble, and annular liquid passage, and for also and importantly accommodating and elongate stretchable and highly elastic check valve sleeve 18 which with the passages formed by rod 16, constitutes a very important feature of our invention.

The lower end of the passage-forming rod 16 is flanged slightly for forming an enlarged head 16a which at its underside also with thimble 13, abuts against the upper smooth terminal face of the enlargement flange 11a of the nozzle discharge tube. At its upper end rod 16 is shaped to form the truncated conical extremity 16b against the terminal portion of which the pressure plug disc 15 abuts, leaving below the disc and within the confines of the thimble 13, an annular liquid passage 19. Radial ports or recesses 20 are formed in the upper annular edge of the thimble 13 to provide liquid access to the said annular liquid passage 19.

Rod 16 is axially drilled from its upper end to a point somewhat below the cross-sectional center of the rod to provide a longitudinal liquid passage 21 having communication at its upper end with a small annular liquid passage 19, by means of a perpendicularly arranged groove or notch 21a which intersects the frustoconical upper extremity 16b of the rod. The lower end of longitudinal liquid passage 21 communicates with a diametrically disposed cross liquid passage 22 which is normally covered by the central annular portion of the elastic stretchable valve sleeve 18.

When sufficient pressure of the liquid downwardly through the passage 21 occurs in operation of the device, the stretchable elastic sleeve 18 will be displaced outwardly and liquid will pass between the sleeve and the periphery of the rod 16 and then downwardly through a large transverse channel or notch formed in the lower end and base portion of the rod. The liquid is thus communicated and forced downwardly as shown by the arrows in FIG. 4, to the upper portion of the dependent nozzle discharge tube 11.

To effectively seal the upper open end of the nozzle head including the chamber 10 formed within head member H, as well as the upper end of thimble member 13, the structure as shown in FIG. 4 employs the following components or parts. A gooseneck fitting indicated in its entirety by the letter G has a rearwardly and upwardly inclined tubular conduit portion 24 externally provided with spaced flexible hose-retaining beads 24a of a tooth-shaped cross section. The fitting, in communication with the tubular hose connection 24 includes an apertured plug member 25 having an enlarged circular flange 25a which has a smooth annular base face adapted to abut and fit against the upper extremity of the tubular thimble 13. As shown, plug element 25 is circularly recessed inwardly of the flange 25a and has a smooth abutment surface 25b which is constructed to abut and apply pressure against the upper edge of the upstanding sleeve element 15a of the plug disc.

To apply pressure to the various enumerated parts including sleeve portion 15a of the plug 15, the upper edges of thimble 13, I provide a screwcap member 26 having internal threads 26a which fit corresponding external threads 27, formed on the outer periphery of the upper portion of head member H. Cap member 26 has an internal flange and shoulder 26a which engages over the annular flange 25a of the plug member 25, and applies pressure downwardly to said plug member as the cap is screwed downwardly upon the head.

Each of the nozzles is angularly and adjustably secured in appropriate position to one of the drills or planter elements as by a clamping collar C (see FIG. 1, and in dotted lines, FIG. 3) which preferably includes a rigid attachment flange 28, preferably formed of heavy nylon, which includes an adjustment projecting arm 28a, integrally formed therewith. The attachment flange is pivotally connected with a clamping bolt 29 screwed into a suitable portion of the drill or other seeder, and we have discovered that with the use of a nylon arm 28a through which the clamping nut extends, the roughness of the nylon will, when the bolt is fairly tight, frictionally hold the nozzle in a variety of tilted, desired positions. The nozzle discharge tube 11 is positioned with its rearwardly included extremity to discharge or spray the liquid along the seeding line, or if desired, close thereto.

We prefer to construct the entire nozzle discharge tube and the thimble 13 of a noncorrosive material such as nylon or stainless steel. The filter screen 14 could also be constructed of a relatively noncorrosive group of filaments such as copper.

While it will be understood that a number of adjustable retaining devices may be employed on grain drills and corn planters as well as other seeding vehicular implements for the individual nozzles, we have illustrated in FIGS. 1 and 2, flexible hose connections HC which extend from and are connected to the appropriate manifold devices from the tanks (not shown) which have their ends interconnected and telescoped with the gooseneck tubes 24 of the respective nozzles. In FIG. 1, a side elevation of one element and hopper of a grain drill is shown, with our embodiment attached thereto. In FIG. 2, the same nozzle attachment is shown in operative position upon a corn planter of present conventional design.

OPERATION

It is to be assumed that the pump for the multiple-nozzle attachment is driven by driving connection with one of the wheels of the implement vehicle, at a speed to vary the quantity of flow substantially in synchronism with the travel speed of the drill or other vehicular planter over the ground. It is further assumed that the operating pressure of the device is preset usually at about 5 to 6 pounds.

With the embodiment shown in FIGS. 3, 4 and 5, the elastic and stretchable sleeve has been chosen to contact closely about the entire lower peripheral area of the passage-forming rod 16, until the predetermined pressure of liquid downwardly through the axial passage 21 of the rod, is obtained. Upon increase in pressure the elongate sleeve will be stretched circumferentially throughout at least the lower portion, beginning with the line of the diametric liquid passage 22 to the lower end of the skirt. The liquid passing between the lower portion of the valve sleeve 18 and the lower portion of the rod, passes from both sides of the rod extremity to the large notched channel 23 into the upper receiving end of the nozzle discharge tube 11.

Referring to the function of our improved filtering device, closely combining with the passage-forming rod 16 with the novel check valve structure previously described, liquid entering the gooseneck fitting G from the hose HC passes radially outwardly through the ports 15b at the upper edge of the disc element 15a of plug 15, thereby passing outwardly and downwardly and through the cylindrical screen 14. A quite uniform filtering of the liquid takes place since the screen from its lower to its upper end is provided with longitudinally spaced sets of segment beads 13f. The liquid passing through the screen is directed to flow upwardly and then radially inwardly through the ports 20 at the upper edges of the thimble into the annular passages of triangular cross section, numbered 19, and from there through the diametric ports 21a into the interior axial passage 21 of the rod. From axial passage 21, the liquid passes through a diametric or double-ported passage which is normally closed by the stretchable elastic check valve sleeve 18.

With the said structure and functions previously described, normal pumping of the liquid into the nozzle head produces wide area filter effects through the combination of screen mesh and longitudinal spaced segment beads or ribs, and to the end that the filtered liquid communicated with the axial passage 21 of the rod, is axially and centrally disposed relative to the ultimate filter tube.

The large area check valve sleeve 18 of highly elastic and stretchable material positively covers a great amount of area of the outer periphery of the rod, and is to be distinguished from any check valve structure of ball or poppet type. In such devices only contact involving theoretically a circular line with the valve seat is made.

Furthermore, it will be seen that a barometric or vacuum seal principle exists in the nozzle head when the sleeve valve closes, to the end that any liquid in the considerable length of the nozzle discharge tube is entirely sealed from air admission and will stay in the tube.

Referring now to the form of the invention illustrated in the vertical sectional view, FIG. 6, a general structure of the nozzle head H and its interior chamber is similar to the form first described. The screen-holding thimble 33 however is of somewhat simpler structure but includes the enlarged flanged base structure 33a, similar to the first type, and also an annular flange 33b over which the lower end of the filter screen 34 is telescoped. In this form, in FIG. 6, the liquid passes through the thimble 33 via radial notches or apertures cut in the upper end thereof, and then downwardly through the cylindrical interior of the thimble, and into an axial passage 35a of a valve seat plug member 35. Member 35 has an axial passage 35a terminating at its lower end through a large area rounded exterior portion 35b of the plug. A circular sheet 36 of stretchable and elastic material such as natural rubber is axially disposed below and in abutment with the lower rounded exterior 35b of the plug member and is retained in concentric relation with the passage 35a by suitable foraminous means such as an upstanding grill indicated as an entirety by the letter V which in the form shown is secured to the top of a removable annular member, 37.

In operation of the form of FIG. 6 the elasticity of the circular sheet 36 retains it in contact with a substantially large semispherical area with the lower exterior of the passage plug 35b. When the liquid is pumped through the system and the pressure is adequate, say over 5 p.s.i., to overcome the stretchability, the passage will be open and the liquid as indicated by the arrows in FIG. 6, will pass around the circumferential edge of valve disc 36 and communicate and enter the upper end of the nozzle discharge tube 11. The upstanding elements 38 of the foraminous cage V, with the disposition and downward pressure of the lower portion 35b of the plug member, causes the circular stretchable disc to wrap around a substantial area of the spherical lower portion of plug 35b, covering not only the valving passage 35a, but a very large concentric zone surrounding that passage. The upper terminals of the circumferentially arranged elements 38 apply light tension to the flexible and elastic valve disc 36, and maintain the disc in concentric relation with the axial passage 35a of the plug member.

It will be understood that instead of using a circular sheet of flexible, stretchable elastic such as natural rubber or latex, the valve element 36 may be remolded to conform even more closely to a greater area of the depending, semispherical lower exterior of the plug member 35. In such instance the upper ends of the circumferentially arranged cage elements 38 position and retain the elastic and stretchable valve member in the desired coaxial and concentric relation with plug 35.

In FIG. 8, a third embodiment of the invention is illustrated wherein essentially as to the positive, stretchable, elastic check valve structure, reversal of parts is employed in comparison with the form of the invention first disclosed. A nozzle head indicated as an entirety by the letter H of the general form of the first nozzle head described is provided, having the same interfitting relationship at the lower portion thereof, with an identical nozzle discharge tube 11. The screen-holding thimble 43 of generally similar exterior configuration to the thimble 13 first described is employed, having the flanged, enlarged lower end 43a of circular shape for slidably fitting the interior of head H in the chamber 10 defined by said head. Thimble 43 has externally of its periphery, the broken segment, screen-distending beads 43c, disposed in longitudinally spaced series.

The cylindrical filter screen 44 is similar to the filter screen 14 previously described, and at its lower end telescopes over an annular shoulder 43d.

Interiorly of the thimble 43 and concentrically spaced therefrom, we employ an elongate, hollow rod 46 which has the dual function of constituting a valve casing with inlet passages as well as a liquid discharge medium communicating with the upper end of the depending nozzle discharge tube 11. Rod 46 may extend upwardly to near the top of thimble 43 or may extend only partially the height of said thimble, but in any event the upper portion thereof, indicated as 46a is closed and the exterior periphery of the rod in conjunction with the interior of thimble 43 forms an upstanding annular passage between the two parts.

Two or more opposed radial liquid passages 47 are formed through the lower or intermediate portion of hollow rod 46 for valved communication with the interior bore 46b of the rod.

An efficient check valve in the form of a thin, cylindrical sleeve 48 constructed of elastic and deformable or stretchable material such as live rubber, is seated in the lower portion of the bore or chamber 46b, of a length several times the diameter of liquid passages 47, and with its longitudinal central portion normally closing the passages and contacting and sealing a substantial cylindrical area of chamber 46b surrounding the said passages. Means are provided for facilitating the installation of sleeve valve member 48 and applying the same under slight compressive tension. Such means may comprise a division in the hollow rod member 46, such as shown in FIG. 8, where the upper solid portion thereof is threadedly secured with sealed effect to the lower portion, with a sealing gasket 49 disposed between the abutting edges thereof.

From the lower end of the internal chamber 46b of the rod a concentric, diminished liquid passage 46c is formed, communicating through the end of the rod with the upper end of the nozzle discharge tube 11.

The lower end of the hollow rod member 46 is enlarged to provide an annular base flange 46d which has at its lower edge an annular channel for receiving an O-ring O-3, which seats against an internal annular flange provided integrally by the base of thimble 43 and identified in FIG. 8 as 43d. Pressure applied downwardly in the assembly of the device, and the tightening of the screwcap 26 (not shown in FIG. 8) forces the base of hollow rod 46 downwardly against the said flange 43d, thereby with the assistance of said O-ring effectively making a seal between the rod and thimble.

In operation of this form of the invention the spray liquid passing through the segment divided annular chamber interiorly of the screen 44 and exteriorly of the thimble 43, passes upwardly and through radial liquid passages (not shown) near the upper end of thimble 43 through the annular passage indicated as 49 between the exterior of rod 46 and the interior of thimble 43. The liquid, as shown by the arrows, then passes downwardly and then through ports 47 when adequate pump pressure is supplied, to deform the sleeve 48 inwardly, thereby opening the valve structure and communicating the spray liquid to the lower interior of the rod chamber 46b, from which the liquid passes axially downward through the passage 46c and into the upper end of the nozzle discharge tube.

From the foregoing description it will be seen that the three embodiments of our invention illustrated have several combinations and important features in common. In all of the embodiments, a pressure-responsive valve element is employed, at least lightly tensioned upon or within the solid rigid member through which liquid entrance or valve passages are formed. The valve element per se in each instance, is made from a stretchable, highly elastic and flexible material such as natural rubber, latex or live rubber, and is of a size and shape to cover not only the valve passage and its seat, but a very large area of the solid component or element through which the valve passage or passages are made. With such structure and with the thickness or material chosen to be responsive in stretching or deformation to the desired operating pressure of the pump system the valve passages and large surrounding areas are contacted and covered very efficiently when the pressure decreases below the predetermined operating value. Thus, in each of the embodiments a barometric seal principle relative to any remaining liquid in the depending nozzle discharge tubes is assured, and no drippage of liquid can take place, in contrast to prior art devices, when the vehicular drill or other implement is standing idle and not in travel.

Furthermore, in each of the embodiments disclosed and illustrated, a novel filter screen system is employed which utilizes an elongate, cylindrical screen distended by a plurality of longitudinally spaced sets of bead segments between which liquid may pass upwardly between the screen and the distending thimble. The filtered liquid must pass upwardly to at least near the upper end of the thimble and prior to screening, will enter at various points of height on the overall structure. Thus, with the properly selected mesh the problem of filtering spray liquids which contain globules and fine granular matter which has existed in prior art devices for years, has been overcome.

With our structure as disclosed herein, flow or dripping of the spray liquid when the seeding vehicle is standing still, and also when the main valves from the tanks are closed and the vehicle is traveling, making turns and the like, has been eliminated positively.

Our novel, pressure-responsive check valve structure works in close combination relation with the elements constituting the screen mounting and distending element or thimble, and the system flow of liquid, first downwardly outwardly of the screen, then inwardly through the screen at various heights, and then upwardly to the upper end and through the thimble.

The three embodiments of the invention may all be manufactured at relatively low cost and involve a minimal number of components and parts. The form of the invention disclosed in FIGS. 6 and 7 constitutes the simplest and less costly of the three embodiments, and will function in highly efficient manner for the purposes intended.

What is claimed is:

1. In multinozzle spraying attachments for seeding implements such as grain drills and corn planters which employ tank means for spray liquid storage and manifold means connected with said tank means, and a plurality of nozzle heads connected with said manifold for supply of spray liquid to said heads, together with a pump unit driven from a rotary element such as a wheel of the implement, to generally synchronize quantity flow of liquid delivered with travel speed of the implement over the ground, those improvements in the construction of the nozzle heads and nozzles which comprise:

a generally cylindrical chamber defined interiorly of said nozzle head;
distended filter means disposed within said chamber and including passage means for delivering filtered liquid to a liquid passage;
a valve seat forming, rigid member having a lower exterior portion of semispherical configuration and having liquid port means extending therethrough in communication with said liquid passage;
a pressure-responsive valve element constructed of flexible, elastic material conforming in shape to said seat-forming, rigid member and being at least lightly tensioned and of an area to not only cover said liquid port means but also to contact and seal with a substantial area of said rigid member surrounding said port means;
said valve element being stretchable and deformable when liquid pressure through said valve passage exceeds a predetermined value, thereby permitting discharge flow of spray liquid around an edge of said valve element;
and means communicating said discharged flow of liquid to the upper end of a depending nozzle discharge tube.

2. The structure set forth in claim 1, and foraminous retaining means pressing upwardly against the under side of said valve element but nevertheless leaving the central portion of said valve element exposed for discharge stretching when the pressure of liquid communicated through said port means exceeds a predetermined level.

3. In multinozzle spraying attachments for seeding implements such as grain drills and corn planters which employ tank means for spray liquid storage and manifold means connected with said tank means, and a plurality of nozzle heads connected with said manifold together with a pump unit to supply spray liquid to said nozzle heads through said manifold, those improvements in the construction of the nozzle heads and nozzles which comprise:

a generally cylindrical chamber defined interiorly of said nozzle head;
distended filter means disposed within said chamber and including passage means for delivering filtered liquid to a liquid passage, said filter means being in cylindrical form;
an upstanding rigid thimble having means spaced longitudinally on the outer surface thereof engaging and distending said cylindrical filter means;
communication passages for communicating filtered liquid within said screen to the interior of said thimble;
a passage-forming cylindrical rod mounted concentrically within said thimble and having a generally axial passage communicating with said communication passages, the exterior of said rod having at least the lower portion thereof formed to define a cylindrical, valve seat forming surface of substantial area;
at least one liquid port communicating said axial passage within said rod with the exterior of said rod; a pressure-responsive valve element constructed of flexible, elastic material in the form of a tubular sleeve telescoped over said cylindrical valve seat forming surface on said rod, said valve element being at least lightly tensioned and of an area to not only cover said liquid port but also to contact and seal with a substantial area of said cylindrical valve seat forming surface surrounding said liquid port;
said valve element being stretchable and deformable when liquid pressure through said valve passages exceeds a predetermined value, thereby permitting discharge glow of spray liquid around an edge of said valve element;
and means communicating said discharge flow of liquid to the upper end of a depending nozzle discharge tube.

4. In multinozzle spraying attachments for seeding implements such as grain drills and corn planters which employ tank means for spray liquid storage and manifold means connected with said tank means, and a plurality of nozzle heads connected with said manifold together with a pump unit to supply spray liquid to said nozzle heads through said manifold, those improvements in the construction of the nozzle heads and nozzles which comprise:

a generally cylindrical chamber defined interiorly of said nozzle head;
distended filter means disposed within said chamber and including passage means for delivering filtered liquid to a liquid passage, said filter means being in cylindrical form;

an upstanding rigid thimble having means spaced longitudinally on the outer surface thereof engaging and distending said cylindrical filter means;

communication passages for communicating filtered liquid within said screen to the interior of said thimble;

a passage-forming cylindrical rod mounted concentrically within said thimble and having a generally axial passage communicating with said communication passages, the exterior of said rod having the lower portion thereof formed to define an enlarged, semispherical, valve seat forming surface through which said axial passage extends;

at least one liquid port communicating said axial passage within said rod with the exterior of said rod through said semispherical valve seat forming surface;

a pressure-responsive valve element constructed of flexible, elastic material conforming in shape to said semispherical valve seat forming surface and snugly fitting against a large proportion of the exterior area thereof in sealing contact therewith around said liquid port;

said valve element being stretchable and deformable under liquid pressure through said valve passage exceeding a predetermined predetermined value, thereby permitting discharge flow of spray liquid around an edge of said valve element; and means communicating said discharge flow of liquid to the upper end of a depending nozzle discharge tube.

* * * * *